United States Patent [19]
Morris et al.

[11] 4,203,206
[45] May 20, 1980

[54] ASSEMBLY MACHINE

[75] Inventors: Jesse L. Morris, Archer; Raymond K. Sugalski, Gainesville, both of Fla.

[73] Assignee: General Electric Company, Gainesville, Fla.

[21] Appl. No.: 783,087

[22] Filed: Mar. 31, 1977

[51] Int. Cl.² .............................................. H01M 2/10
[52] U.S. Cl. ....................................... 29/731; 29/564.1; 29/623.1; 29/742; 242/56.1
[58] Field of Search ............. 29/730, 731, 623.1, 29/623.2, 742, 564.1, 234; 429/94; 242/56.1

[56] References Cited
U.S. PATENT DOCUMENTS

| | | |
|---|---|---|
| 2,731,183 | 1/1956 | Shaw ............................ 242/56.1 X |
| 3,623,918 | 11/1971 | Cailley ............................ 29/623.1 |
| 3,734,779 | 5/1973 | Shoeld ............................ 429/94 |
| 3,815,188 | 6/1974 | San Pietro ...................... 242/56.1 X |
| 3,829,952 | 8/1974 | Trask ............................ 29/731 |
| 4,003,112 | 1/1977 | Miller et al. ................... 242/56.1 X |

*Primary Examiner*—Carl E. Hall

[57] ABSTRACT

An assembly machine, preferably, for winding an electrolytic cell roll, for transporting a roll after winding from the winding station to a roll canning station and for inserting the cell roll into a can at the canning station. The transport is a conveyor with a plurality of nests thereon in which the cell roll is initially wound at the winding station and then carried on the conveyor to the canning station.

13 Claims, 15 Drawing Figures

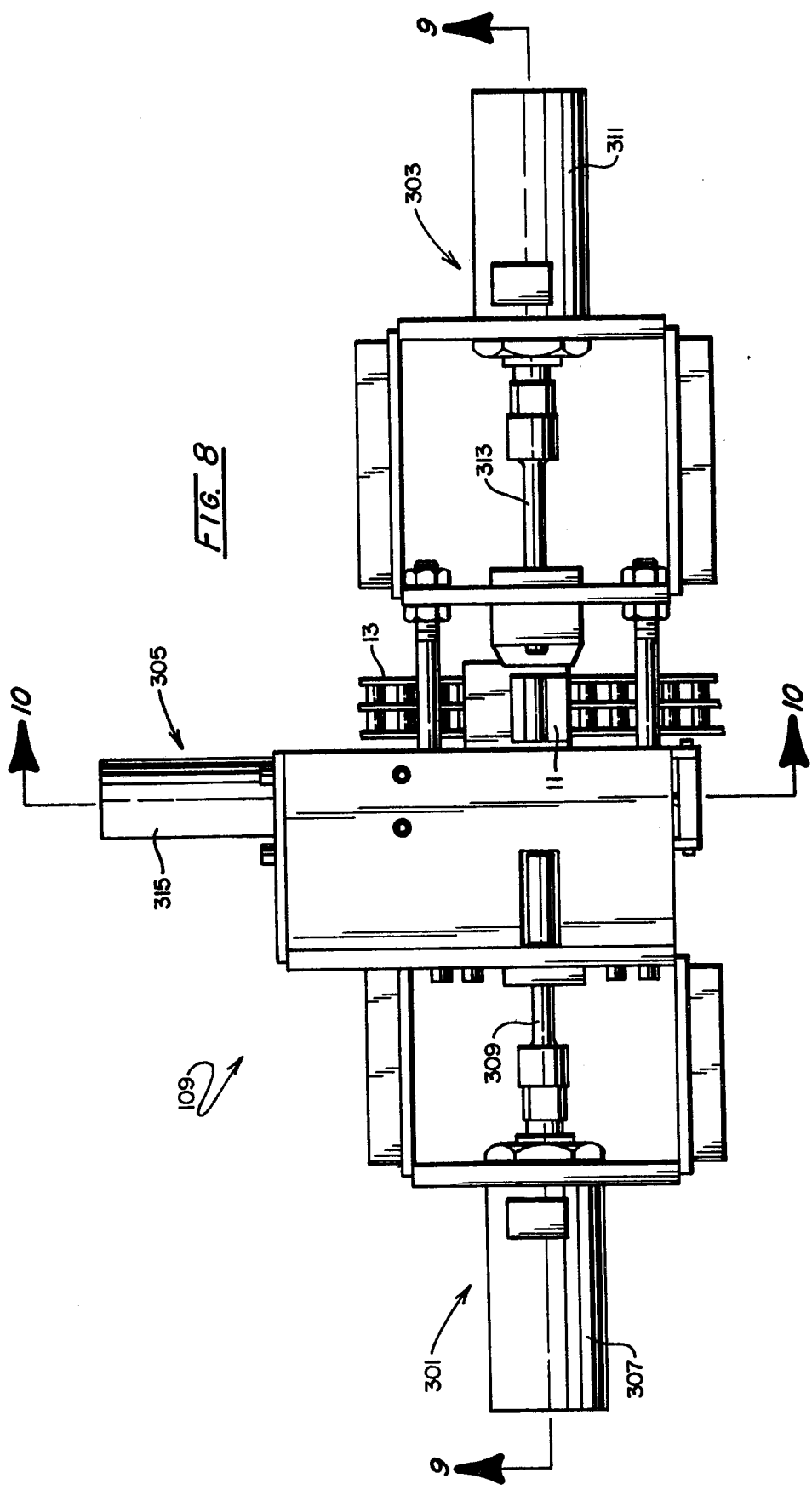

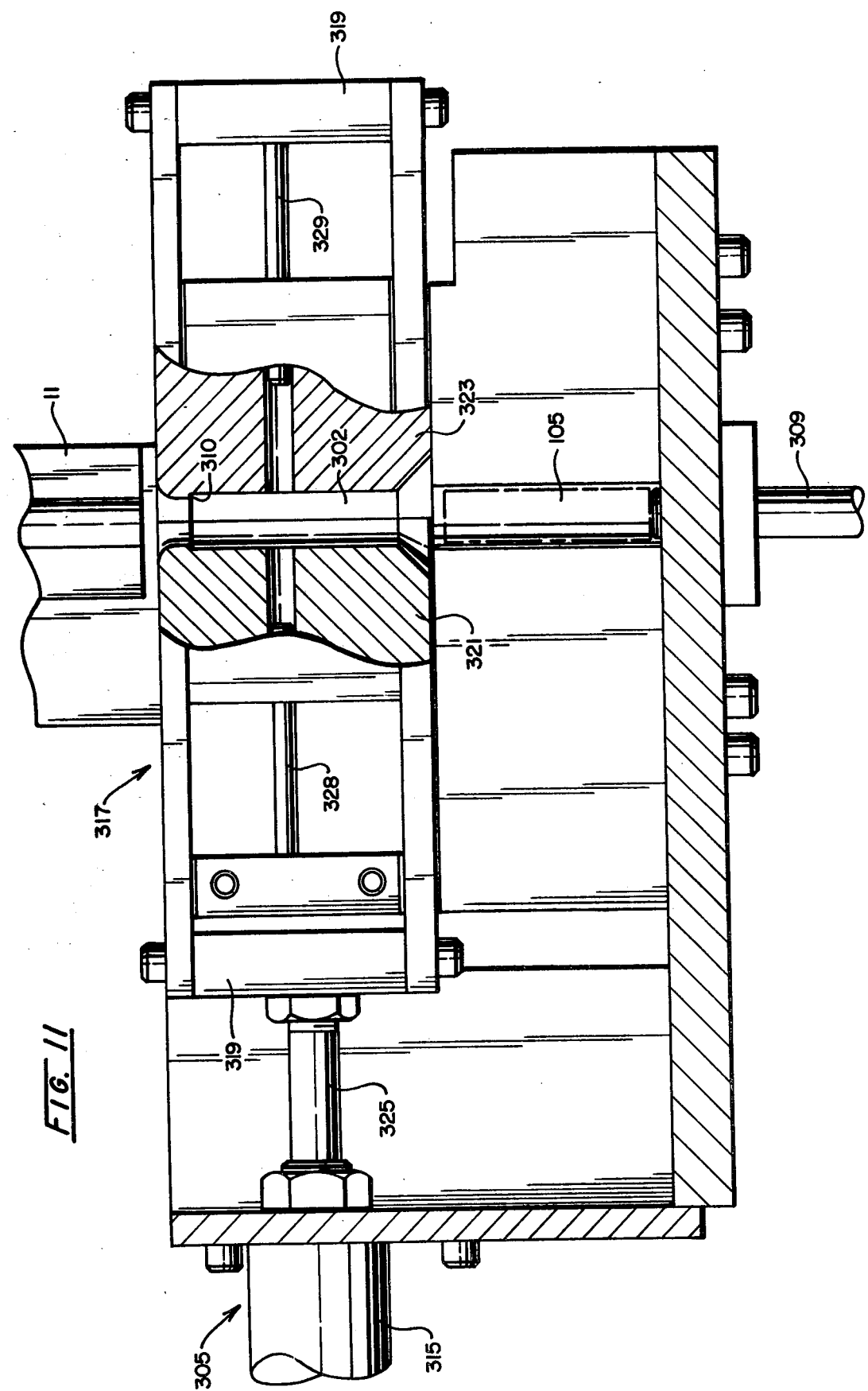

ASSEMBLY MACHINE

CROSS-REFERENCE TO RELATED APPLICATION

Cross-reference is made to application Ser. No. 783,260, filed Mar. 31, 1977 filed simultaneously with this application in the name of J. L. Morris and assigned to the asignee of the invention herein. Application Ser. No. 783,260, filed Mar. 31, 1977 is directed to a feeder assembly for strip material which is shown and described in connection with FIGS. 4, 5 of this application Ser. No. 783,260, filed Mar. 31, 1977 and which is a component of the cell roll winding station in accordance with the features of the joint invention described and claimed herein.

BACKGROUND OF THE INVENTION

This invention relates to assembly machines and, more particularly, to machines for winding strip material into a roll and for inserting the wound roll into a container.

Heretofore, assembly operating for electrolytic cells have been semiautomated. For example, heretofore cells have been found by manually feeding separator along a guide from a spool supply, manually fixing the separator material in a segmented, motor driven arbor, interleaving the positive and negative plates with a separator and applying a cylindrical roller against the arbor and actuating the motor drive of the arbor to wind the strip material into a roll. After winding the roll is removed from the arbor and forwarded manually to another work station for welding of electrode tab(s) to the roll (only in certain types without prewelded tabs attached during plate making). Following tab welding and certain tests, the roll is eventually manually inserted into a can.

Accordingly, it is an object of the invention to provide an improved assembly machine particularly for electrolytic cells.

It is another object of the invention to provide a machine for automating the assembly procedure for electrolytic cells.

SUMMARY OF THE INVENTION

These and other objects of the invention are accomplished by an assembly machine comprising the following features individually and in combination an automated winding station for strip material; a roll canning station for inserting a roll into a container; and a conveyor for moving a roll from the winding station to the canning station in a nest in which the roll is wound.

BRIEF DESCRIPTION OF THE DRAWINGS

FIG. 8 is a fragmentary plan view of a station for inserting a cell roll into an exterior can or casing.

FIG. 11 is a cross-sectional view taken along line 11—11 of FIG. 9.

DESCRIPTION OF PREFERRED EMBODIMENT

Figure 1:
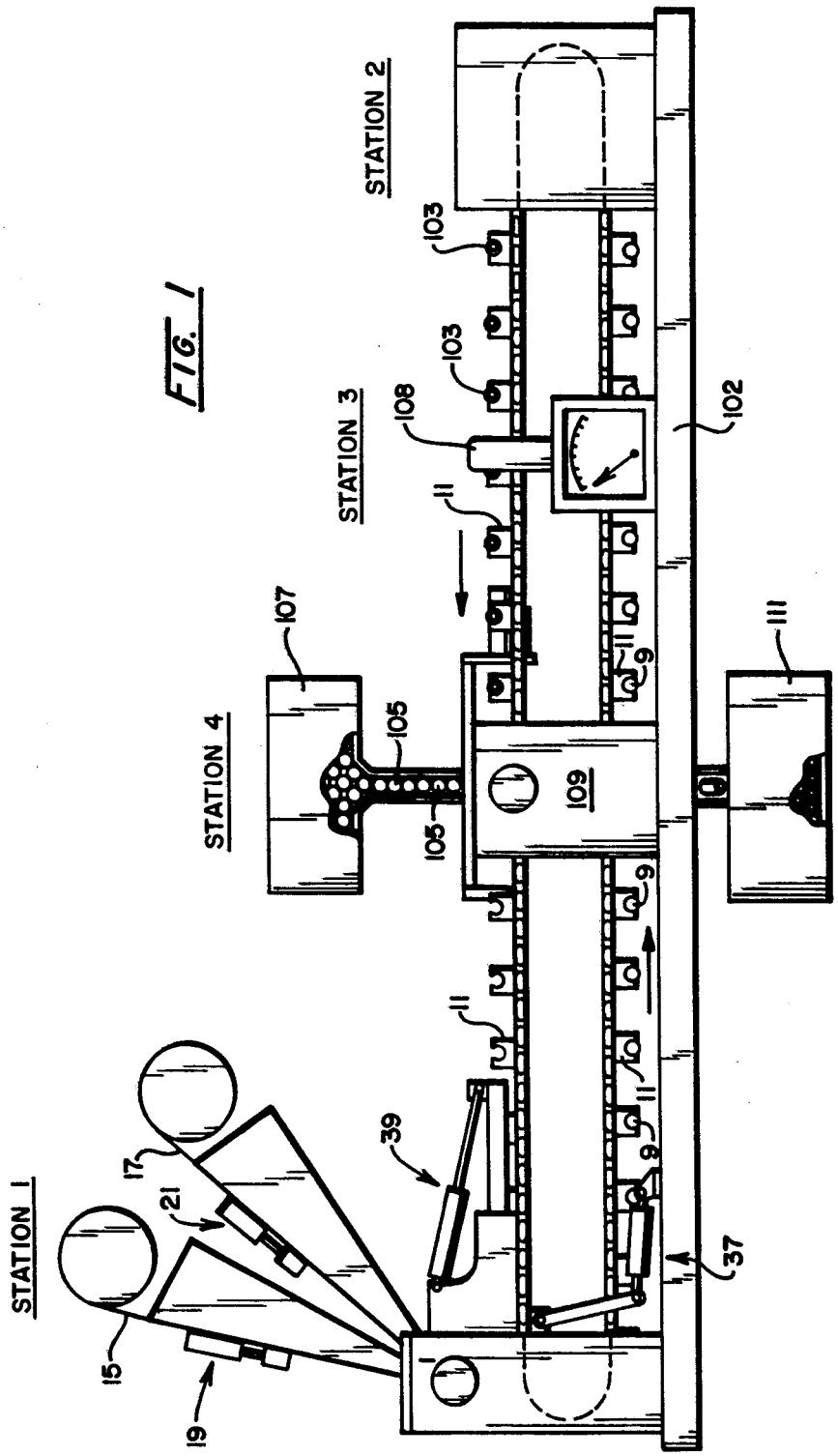
FIG. 1 is schematic illustration of a side elevation of a cell assembly machine in accordance with a preferred embodiment of this invention.

Referring to FIG. 1, a preferred embodiment of a cell assembly machine 101 is shown. Machine 101 comprises four basic work stations mounted on a table 102 (only the top being shown) and a roller chain conveyor 13 on which a plurality of nests 11 are mounted. Nests 11 are sequentially positionable at each of the four work stations by indexing conveyor 13. In brief, the operations performed at each of the work stations are as follows:

Station 1—Cell Winding. A positive plate, negative plate and two strips of separator are wound into a cell roll 9 in a nest 11 positioned at the cell winding station. The plate and separator arrangement of cell roll 9 is preferably constructed as shown and described in connection with FIGS. 1–3 of application Ser. No. 681,973 filed on Apr. 30, 1976 and assigned to the asignee of the invention herein. Ser. No. 681,973 is hereby incorporated by reference herein.

Station 2—Electrode Tab Formation and Welding. An electrode tab 103 is formed from sheet stock material, is transferred by a tab handler and is welded to the cell roll by a percussion welder to the positive plate of roll 9. The mechanism tab formation and welding is not a part of this invention and will not be described in detail herein. In the preferred embodiment, a rectangular strip tab is prewelded or mechanically attached to the negative plate during plate assembly prior to winding and thus only a tab 109 (as shown) in FIG. 2 of Ser. No. 681,973, now U.S. Pat. No. 4,029,856) is percussively welded to the positive plate of roll 9 at station 2.

Station 3—High Potential Tests. A voltage of 300 volts is applied across the negative and positive plates via a pair of electrodes only one of which (electrode 108) being shown, and the current is sensed to determine whether the cell roll is shorted. If the cell roll is not shorted the machine then indexes the roll nest into the next station. If three negative signals are detected in a row from three nests, that is, three cells are shorted or three electrode tabs are missing. The machine automatically stops. Also, defective cell rolls may be ejected from the nest at this station upon the indication of a negative signal sensed by the probe.

Station 4—Cell Roll Canning. A case 105 is fed from a vibratory bowl feeder 107 into a roll canning assembly 109. With a case 105 in position a wound roll 9 is inserted into a case 105. After insertion the cell (roll 9 and can 105) drops from the assembly 109 due to the force of gravity into a storage bin 111.

The sequential movement of conveyor 13 and the sequential performance of individual operations at each work station is preferably controlled by a conventional programmable controller (not shown) such as model 5T1 marketed by Texas Instruments Company. Briefly, the controller includes a push button operated programmer into which program instruction are entered. The performance of the functions at each work station is sequenced through the use of limit switches and photo cells provided at each work station which provide input signals to the controller to produce the desired action output signals to turn on or off electric motors, relays and solenoid air valves for operating air cylinders which devices collectively are used to perform the basic machine functions generally and at each work station. As will be recognized, other conventional control systems may be used with this invention.

Figure 2:
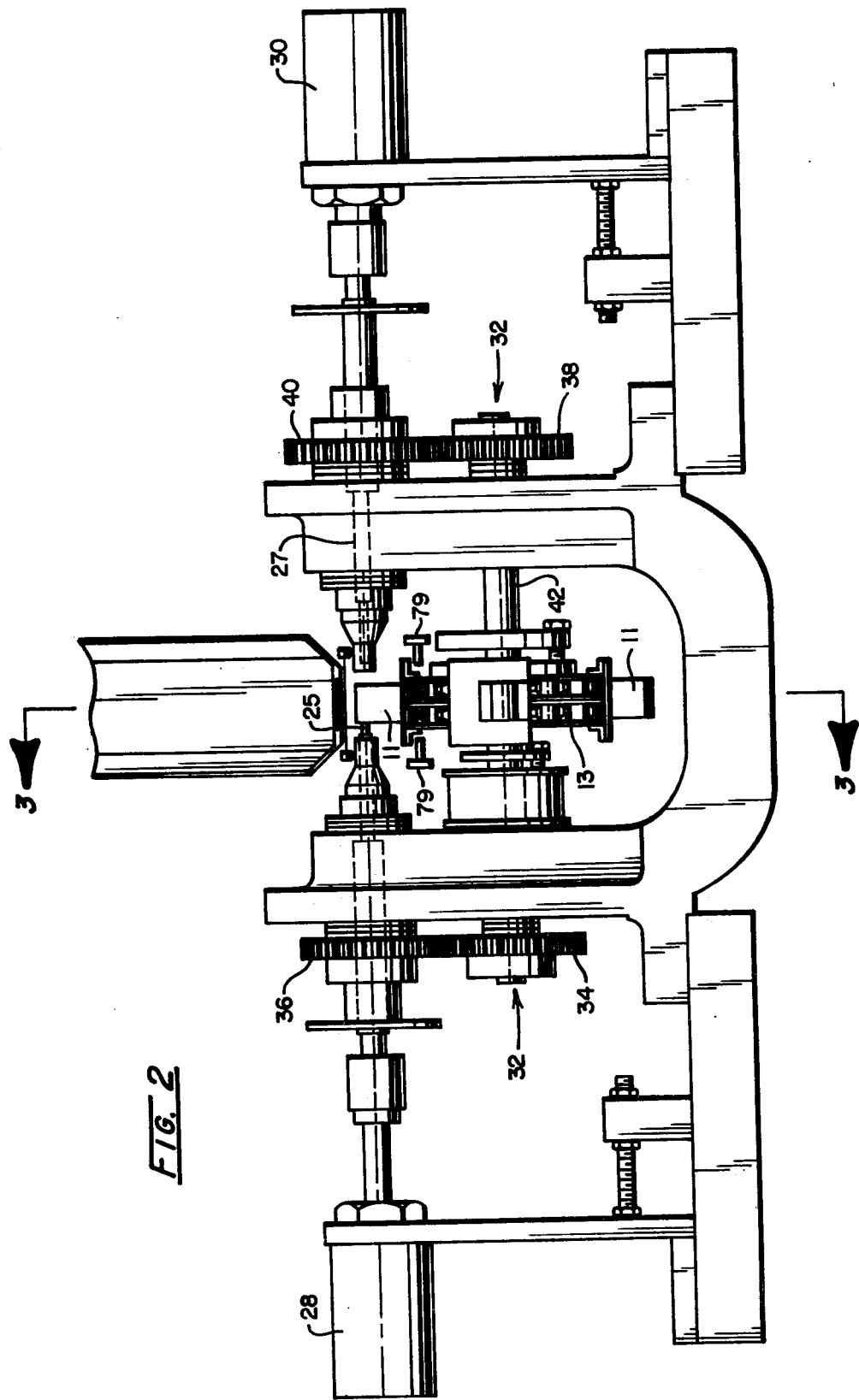
FIG. 2 is a fragmentary elevational view of the left end of the cell assembly machine of FIG. 1.
Figure 3:
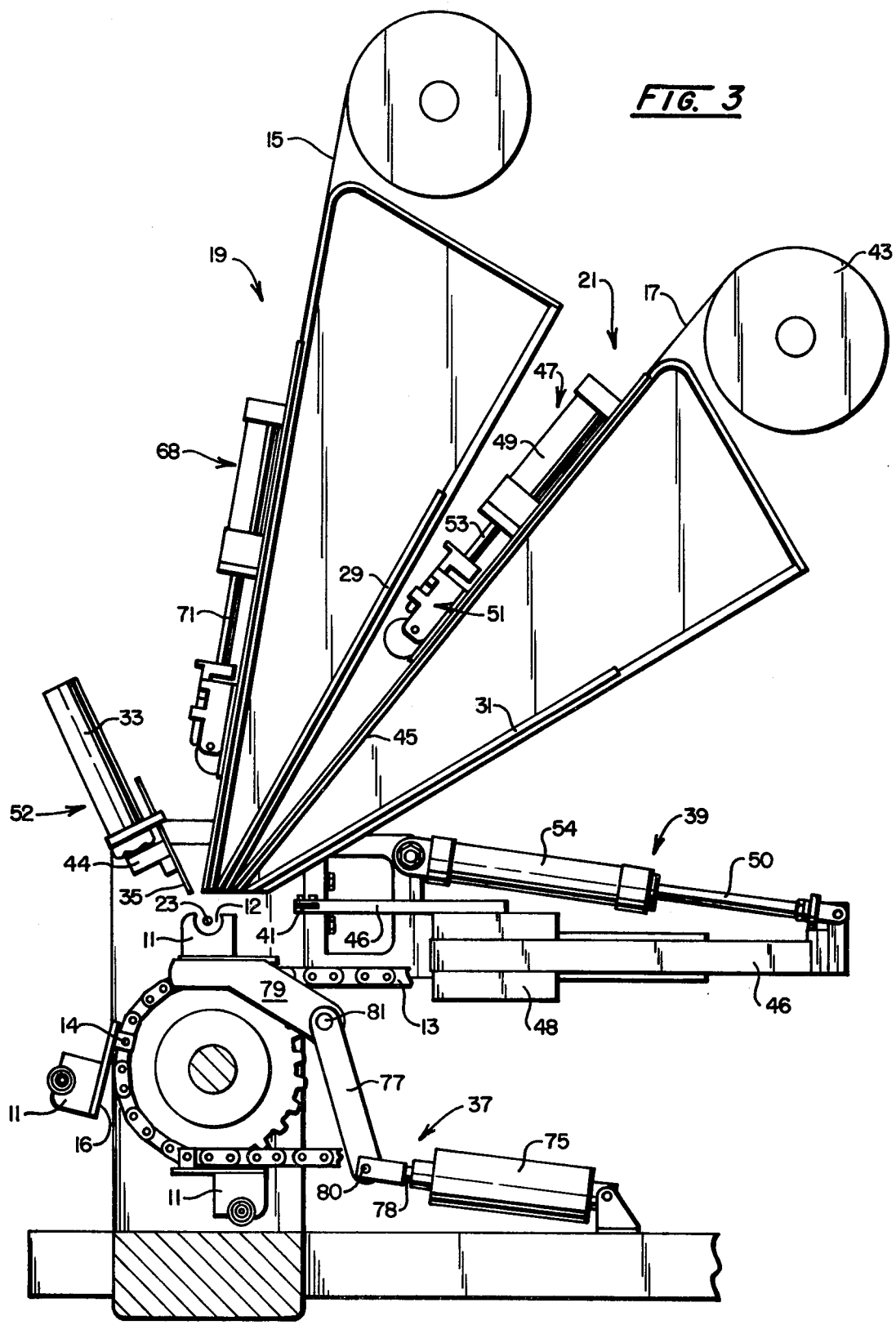
FIG. 3 is a fragmentary cross-sectional view taken along line 3—3 of FIG. 2.

Referring now to FIGS. 2 and 3, cell winding station 1 is shown for winding a positive plate, a negative plate, and two strips of separator into a cell roll 9. A roll 9 is wound inside a winding nest 11. A plurality of winding nests 11 are provided on a chain conveyor 13 which is sequentially indexed to bring each nest 11 into the cell roll winding station. Separator material is supplied to the winding station in two strips 15, 17 from a first and second separator supply stations 19 and 21. The positive and negative plates and separator are wound about a split arbor 23 comprised of the first arbor segment 25 and a second arbor segment 27. Each segment 25, 27 is mounted for reciprocal movement along its longitudinal axis. Movement of segments 25, 27 is controlled by air cylinders 28, 30 respectively. Also arbor 23 is rotatable about its longitudinal axis via gear drive 32. Gear drive 32 is comprised of a pair of gears 34, 36 for driving segment 25 and of a second pair of gears 38, 40—identical to gear pair 34, 36—for driving segment 27. Gear drive 32 is energized by rotation, by any conventional means such as an electric motor, of axle 42 which has gears 34, 38 fixedly mounted at its respective ends thereby to provide synchronous rotation of segments 25, 27.

A nest lift 37 is provided for adjustably positioning nest 11 relative to the axis of arbor 23. Each nest 11 is pivotably mounted to chain 13 by a pin 14. The nest lift 37 comprises a penumatic cylinder 75, pivot arms 77, 79 which are pivotably mounted for conjoint movement about fixed pivot 81. Pivot arm 79 has a bifurcated end (FIG. 2) for engaging the base of a nest 11 disposed at the cell rolling winding station at a point remote from pivot point 14. An actuator arm 78 of pneumatic cylinder 75 is pivotably mounted to pivot arm 77 at a pivot 80.

Negative and positive plates are fed into an opening 12 of nest 11 along negative plate guide 29 and positive plate guide 31, respectively. A detent 52 is provided for positioning the separator advanced from supplies 19, 21 properly in the opening 12 of nest 11 and to aid in the engagement of the separator strips 15, 17 with arbor 23. Detent 52 is comprised of an air cylinder 33 and a detent arm 35 which is mounted on a cylinder rod 44 of air cylinder 33 for reciprocal movement toward and away from nest 11.

A hot-wire cutter 39 is provided for severing strips 15, 17 after a roll has been wound. Cutter 39 comprises an air cylinder 54, cutter slide 46 which is reciprocally slidable in guide 48 toward and away from a nest 11 in the cell roll winding station. Slide 46 is connected to air cylinder 54 via cylinder rod 50 and is movable toward nest 11 upon retraction of rod 50 into cylinder 39 and away from nest 11 upon extension of rod 50 from cylinder 39. An electrically heated wire 41 is fixed at the end of slide 46 for severing by burning the strips 15, 17 during each winding cycle.

In brief, the winding of a roll is accomplished by feeding lengths of separator strip 15 from supply 19 and of separator strip 17 from supply 21 downwardly toward nest 11. The first arbor segment 27 is axially inserted into opening 12 of nest 11 and then detent 52 is actuated to extend a detent arm 35 downwardly (FIG. 3) to bias the strips 15, 17 against arbor segment 27. The second arbor segment 25 is then axially inserted into opening 12 and separator strips 15 and 17 are captured between arbor segments 25, 27. Detent arm 35 is then retracted. Nest 11 is then lifted by nest lift 37 unil the lower wall of opening 12 engages arbor 23. An operator then manually loads a negative plate by sliding it along negative plate guide 29 and a positive plate by pushing it along positive plate guide 31. Arbor 23 is then rotated to wind the plates and strips 15, 17 into a roll. After winding, hot wire cutter 39 is then actuated to bring hot wire 41 into engagement with strips 15, 17 thereby to severe strips 15 and 17 from the wound roll. Nest lift 37 is then deactuated to lower the nest 11 and the arbor segments 25 and 27 are retracted from nest 11.

SEPARATOR FEEDING

As shown in FIG. 3, the separator supplies 19, 21 are identically comprised and a detailed description of only one is given below. Supply 21 is generally comprised of a separator source 43, which can be of any conventional construction such as a wound roll of separator on a spool, separator guide 45 and feeder assembly 47. Separator strip 17 from source 43 is threaded along guide 45 under the feeder assembly 47 toward the nest 11.

Figure 4:
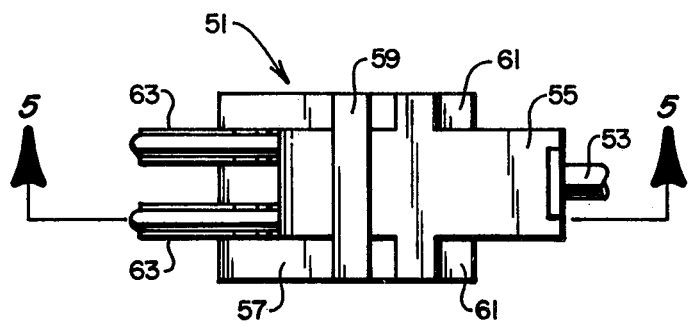
FIG. 4 is a plan view of a clamp of a separator feed assembly shown in FIG. 3.
Figure 5:
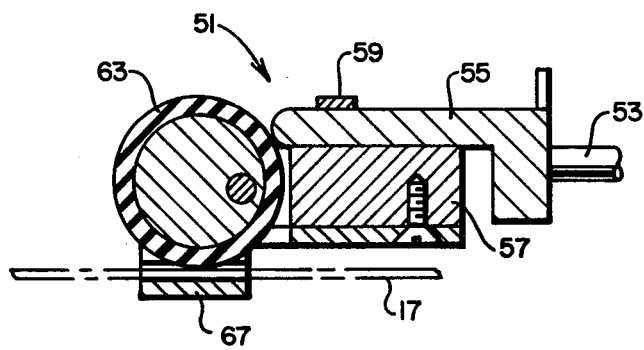
FIG. 5 is a cross-sectional view taken along line 5—5 of FIG. 4.

In reference to FIGS. 3, 4, 5, the feeder assembly 47 is comprised of a pneumatic cylinder 49 coupled to a clamp 51 via a cylinder rod 53 for opening and closing the clamp on strip 17. Strip 17 is fed along guide 45 when the air cylinder 49 is actuated to extend rod 53 to close the clamp 51 on strip 17 and to push the strip 17 downwardly toward nest 11. Upon retraction of arm 53, the clamp 51 is opened and allows strip 17 which is captured in arbor 23 to slide through clamp 51 as clamp 51 is retracted by arm 53. Feeder assembly 47 is thus reset to feed an additional length of separator strip 17 in the next winding cycle. As shown in FIGS. 4, 5 clamp 51 is comprised of jaws 57, 67 and a clamp slide 55 which is mounted for a reciprocal movment in jaw 57 between contact 63 and stop 61. When slide 55 is slid to the left (FIG. 5), an eccentrally pivoted contact 63 of jaw 57 is engaged by slide 55 and is pivoted about pivot 65 to engage lower jaw 67. In this position clamp 51 is closed and clamps strip 17 between contact 63 and jaw 67. With clamp 51 closed and as arm 53 is continued to be extended toward nest 11, strip 17 is pulled from separator source 43. When slide 55 is moved to the right (FIG. 5) away from jaw contact 63, slide 55 disengages contact 63 and contact 63 and jaw 67 are opened. Movement of slide 55 to the right is continued until engagement with stop 61. Upon engagement of stop 61, clamp 51 is moved to the right with the continued retraction of rod 53. After the clamp 51 is opened, contact 63 and jaw 67 are free to slide over strip 17 as clamp 51 is moved away from nest 11.

CELL ROLL WINDING

Figure 7A:
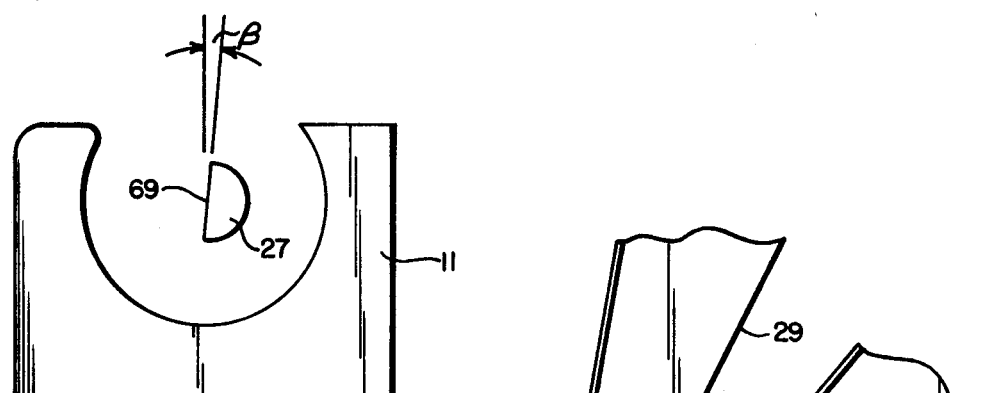
FIGS. 7A–7E are schematic illustrations of the successive steps used to wind a cell roll in accordance with this invention.

Referring to FIGS. 7A through 7E, the winding cycle is initiated upon the indexing of nest 11 into the winding station. As shown in FIG. 7A, arbor segment 27 is axially inserted into nest 11 with a flat side 69 positioned at an angle β of approximately 5 degrees so that separator strips 15, 17 will mate with flat side 69.

Figure 7B:
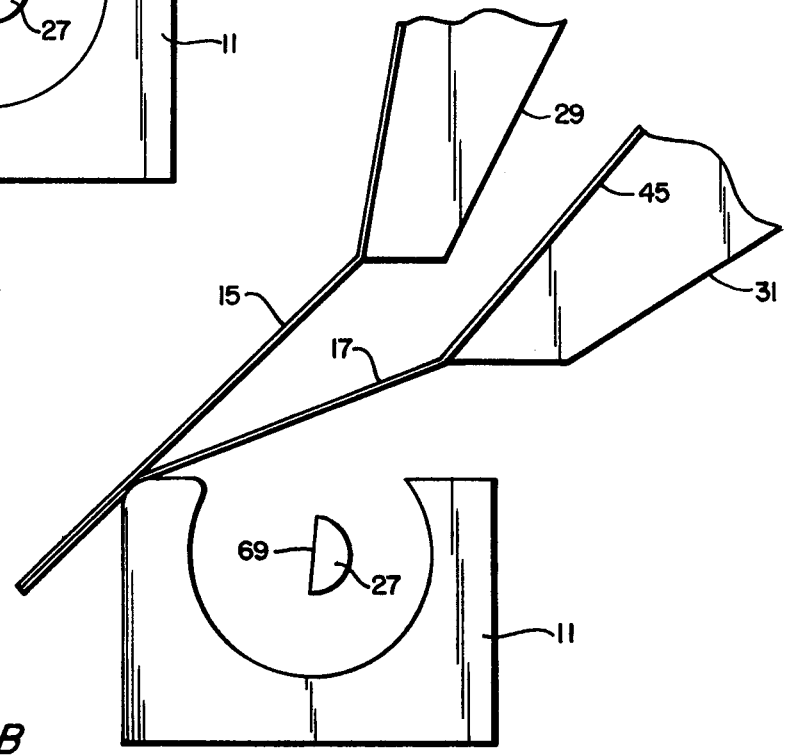

As shown in FIG. 7B separator supplies 19, 21 are then actuated to feed lengths of separators 15, 17 toward nest 11. As shown the lengths of strips 15, 17 advanced toward nest 11 are approximately of the same length. Only one of the strips 15, 17 need be of the approximate length shown in FIG. 7B. The other strip may be of a length sufficent only to overlap flat side 69.

Figure 7C:
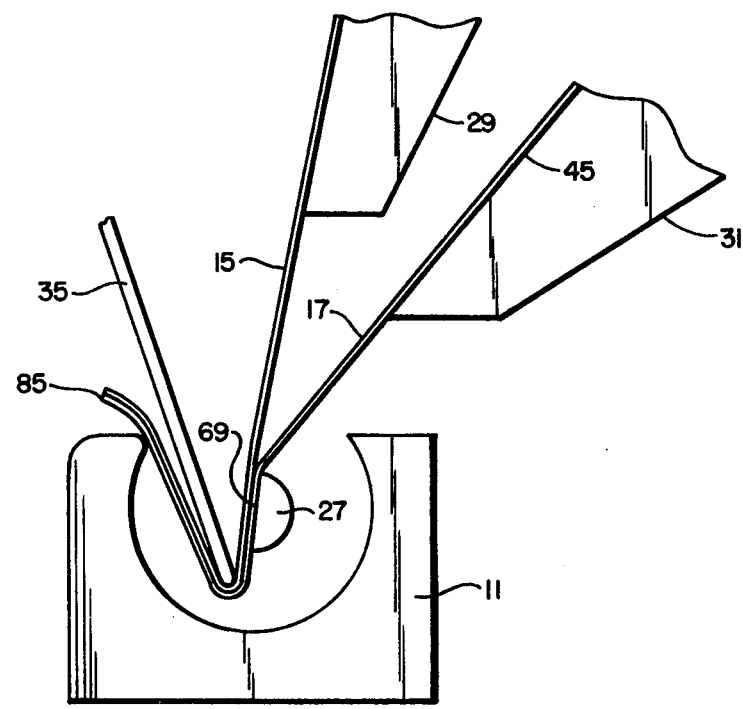

As shown in FIG. 7C, detent 52 is actuated and detent arm 35 is projected into opening 12 of nest 11 to bias separator strips 15, 17 to mate with flat side 69. With the separator strips 15 and 17 pulled across arbor segment 27, arbor segment 25 is axially inserted into nest 11 and traps the separators against segment 27.

Figure 6:
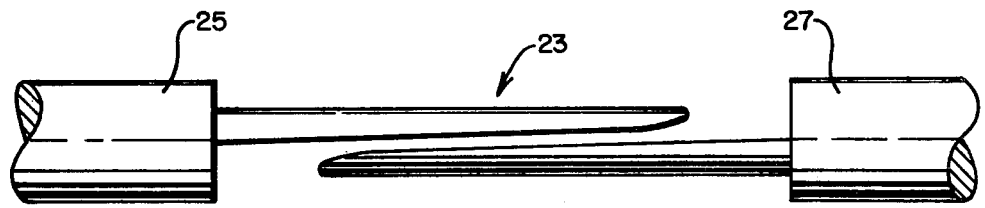
FIG. 6 is a fragmentary view of a cell roll winding arbor disposed in winding position in accordance with this invention.

The relative position of segments 25, 27, both in extended position in nest 11 are shown in FIG. 6 in the absence of strips 15, 17. Arms 53, 71 of feed assemblies 47 and 68 remain extended after feeding the separator strips downwardly until the arbor segment 25 has entered nest 11 and strip 15, 17 are captured in arbor 23. Strips 15, 17 are thus held firmly as the cylinder rods 53 and 71 are retracted and slip through clamps 51, 73.

Figure 7D:
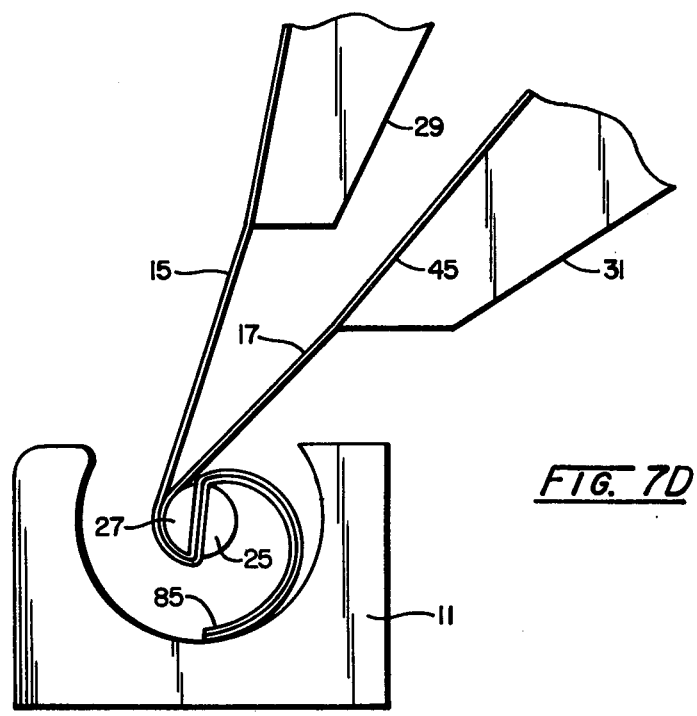
Figure 7E:
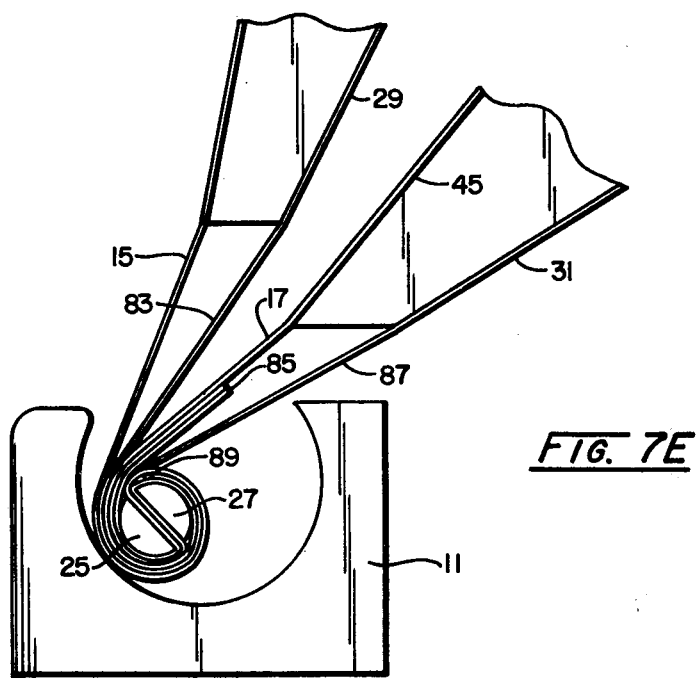

As shown in FIG. 7D, detent arm 35 is then retracted and arbor 23 is then rotated through a predetermined angle to further entwine the separator. Nest 11 is elevated by nest lift 37 to engage the bottom side of nest 11 with arbor 23 as shown in FIG. 7D thereby permitting the roll to be tightly wound around arbor 23. (This is accomplished by the outward movement of arm 78 from pneumatic cylinder 75 to rotate pivot arms 77, 79 in a clockwise direction about pivot 81.) With nest 11 elevated, a negative plate 83 is inserted between strips 15, 17. Arbor 23 is rotated approximately one revolution so that the end 89 of the negative plate 83 is encompassed by the outer turn of plate 83. This arrangement prevents any rough edges or burrs on the end of the negative plate 83 which may pierce the separator from contacting the positive plate thereby to form a short-circuit path when winding the roll. As shown in FIG. 7E, a positive plate 87 is then inserted between arbor 23 and a trail ends 85 of strips 15, 17. The positive plate is positioned so that it engages separator 15 at a point on the circumference of arbor 23 which is clockwise of the end 89 of plate 83, and on the opposite side engages a triple layer of separator formed by separator 17 and the trail ends of separators 15, 17. This also helps to prevent the formation if short-circuit paths by rough edges of burrs on the end of the positive plate. After insertion of the positive plate 87 in this manner, arbor 23 is again rotated to complete the winding of the plates 83, 87 and strips 15, 17. Arbor 23 is then stopped and the hot wire cutter 37 is actuated to bring hot wire 41 into contact with and burn through strips 15, 17. Arbor 23 is then again rotated to completely wind the loose separator ends into the nest 11. The nest lift 37 actuator is then deactivated to lower nest 11 to its initial position. This completes the winding cycle.

Referring to FIGS. 8-11, a preferred embodiment of a cell roll canning station 4 is shown. As shown best in FIGS. 8, 9, the station is generally comprised of a can pusher 301 for moving a can 105 from the bottom of a stack of cans 105 (FIGS. 1, 9) to a loading position 302, a roll pusher 303 for moving a cell roll 9 from a nest 11 into a can 105 at the loading position 302 and a cell ejection mechanism 305 for releasing the cell 106 (can with a cell roll inserted) from the loading position 302 into storage bin 111 via an ejection slide 304.

Figure 9:
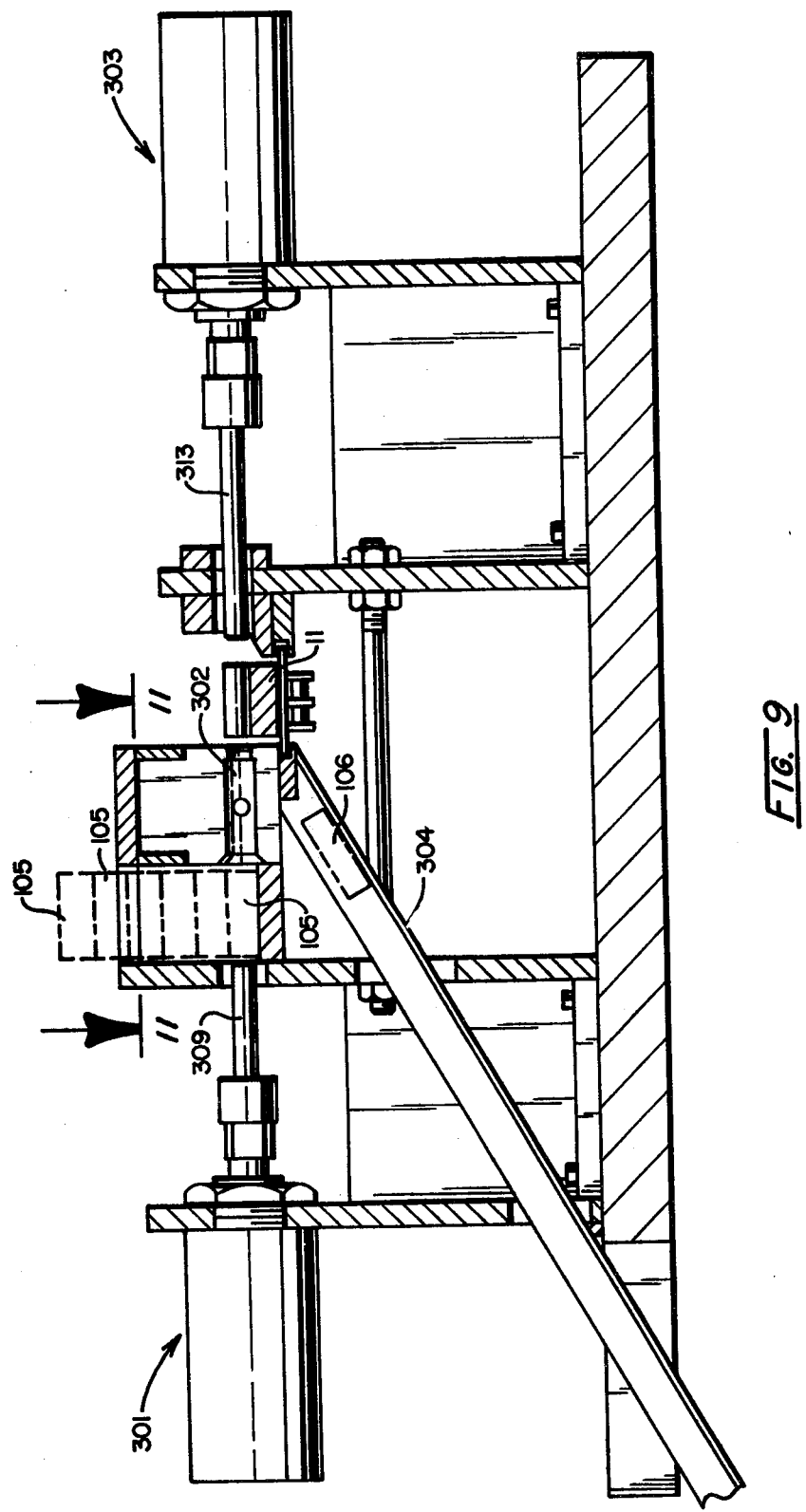
FIG. 9 is a cross-sectional view taken along line 9—9 of FIG. 8.
Figure 10:
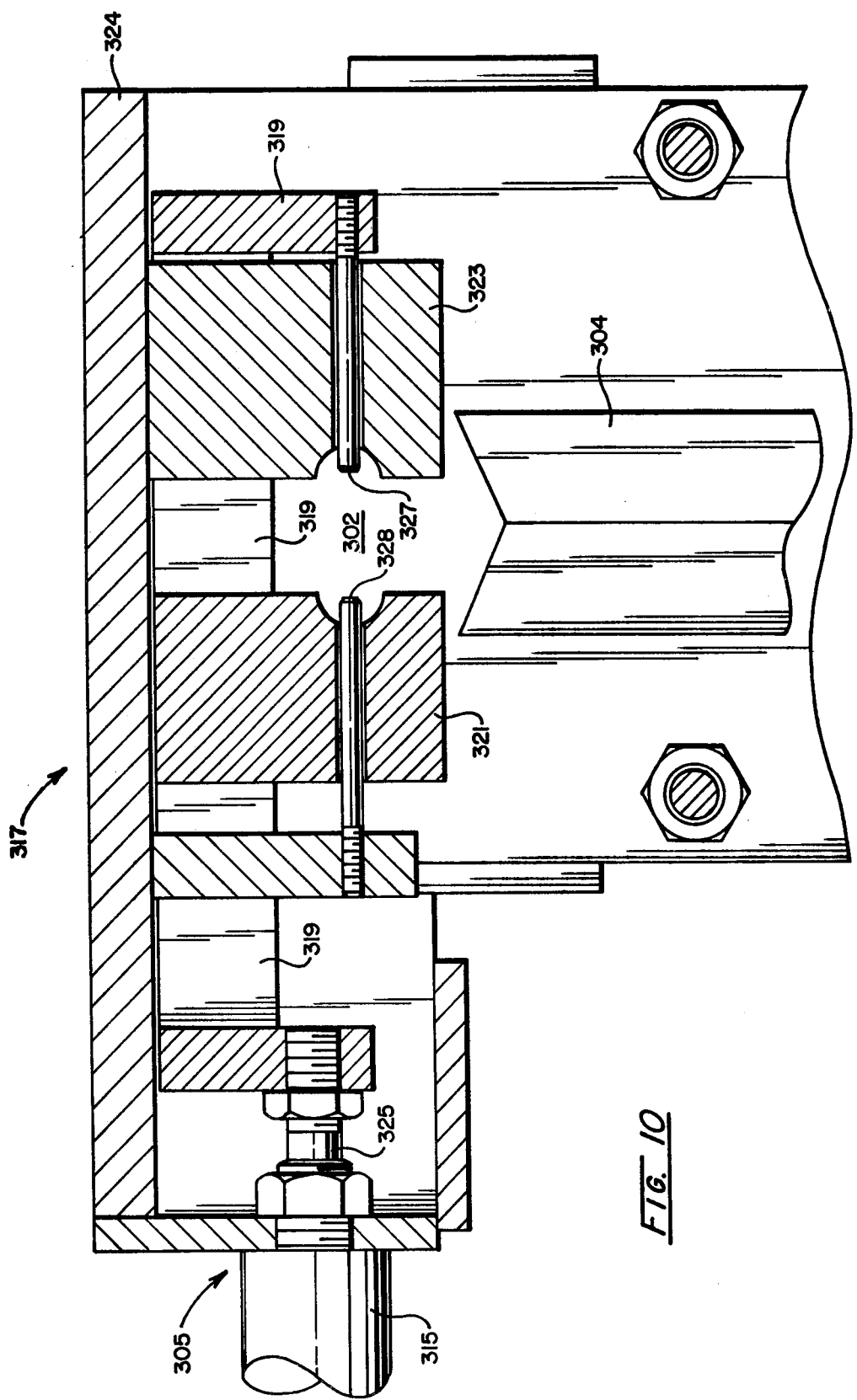
FIG. 10 is a cross-sectional view taken along line 10—10 of FIG. 8.

Can pusher 301 (FIGS. 8, 9) is comprised of an air cylinder 307 with a cylinder rod 309 mounted for reciprocal movement toward and away from loading position 302. In FIGS. 8, 9 the rod 309 is shown in its retracted position. When the cylinder 307 is actuated the rod 309 is extended to the adjacent opening of loading position 302.

Roll pusher 303 is comprised of an air cylinder 311 with a cylinder rod 313 mounted for reciprocal movement toward and away from loading position 302. When cylinder 313 is actuated rod 311 is extended through opening 12 of a nest 11 at the canning station to the adjacent opening of loading position 302.

Cell ejection mechanism 305 (FIGS. 8, 10) is comprised of an air cylinder 315 and loading and ejection clamp 317 which defines loading position 302. Clamp 317 includes a reciprocally movable slide bar 319 having one clamp jaw 321 fixed thereto. Clamp jaw 317 cooperatives with a second clamp jaw 323 fixed to a stationary jaw support 324 to define loading position 302 and to selectively hold a can 105 for roll loading and for release of a can 105 after loading.

Clamp 317 is opened (FIG. 10) and closed (FIG. 11) on a can 105 by interconnection of slide bar 319 with air cylinder 315 via reciprocally movable cylinder rod 325. Ejection of a can 105 is insured by the provision of a pair of ejection pins 327, 328. Pin 327 is fixed to slide 319 for movement therewith. Pin 328 is fixed to stationary jaw support 324.

In operation, upon the movement of a nest 11 into the canning station and with clamp 317 in closed position (FIG. 11) can pusher 301 (i.e., air cylinder 307) is actuated to extend rod 309 to contact the closed end of the lowermost can 105 in the stack and to push can 105 to the right (FIG. 9) until the edge of the open end of can 105 engages a circumferential lip 310 formed on jaws 321, 323 (FIG. 11). With a can 105 held in the loading position 302 by rod 309 the roll pusher 303 is then actuated to push a roll 9 from nest 11 and into the can 105 located in position 302. After loading, can pusher 301 and roll pusher 303 are deactuated to retract rods 309, 313, respectively. Then air cylinder 315 of ejection mechanism 305 (FIG. 10) is deactuated to retract arm 325 to move slide 319 and jaw 321 relative to stationary support 324 and jaw 323 thereby opening clamp 317 and releasing a cell 106 onto slide 304. As slide 319 is moved to the left from the closed position of ejection clamp 317, pin 329 is moved to the left and through an opening in fixed jaw 323 and projects into position 302 to insure release the can 105 from jaw 323 and fixed pin 328 is projected through an opening in movable jaw 321 and into the recess in jaw 321 to insure release of a can 105 from jaw 321. Air cylinder 315 is then actuated to close clamp 317 (FIG. 11). This completes the entire sequence of operation of the canning station 4. The next sequence is restrated again by the indexing of the next nest 11 into canning station 2.

It will be recognized by those skilled the art that while the invention has been shown and described in connection with a preferred embodiment for assembly of electrolytic cells (e.g. Ni-Cd) the invention is applicable to assembly of other wound products such as capacitors. Also, the winding station may be use independently of the canning station to wind flexible strip materials of many types. In addition, while certain preferred work stations have used to illustration the invention, others may be used with the assembly machine. Accordingly, the appended claims are intended to cover such all modifications which are within the true spirit and scope of the invention.

We claim:

1. A machine for winding strip plate and separator materials into a coil and for assembling the coiled materials into a container comprising:
(a) a coil winding station,
(b) transport means including a conveyor and a plurality of nests fixed to said conveyor and sequentially positionable at said winding station, each nest having a cylindrical opening oriented transverse to the direction of motion of said conveyor,
(c) means for sequentially advancing said conveyor to position said nests, one after the other, at said coil winding station,
(d) an arbor having two segments oriented parallel to the longitudinal axis of said nest opening and mounted for reciprocal movement along said longitudinal axis from the opposite ends of said nest opening for insertion into said nest opening when the nest opening is at said winding station,
(e) means for reciprocating said arbor segments and means for synchronously rotating said segments when said segments are in said nest opening,
(f) means for feeding a positive plate, a negative plate, and separator material to said nest and said arbor when said nest is positioned at said winding station,
(g) a canning station,
(h) means for moving said nest with said positive plate, said negative plate and said separator material coiled therein to said canning station, and
(i) means at said canning station for moving a coiled roll unit from said nest positioned at said canning station into a can in said canning station.

2. The machine of claim 1 further comprising a nest lift for adjustably positioning a nest at said winding station in a direction perpendicular to the longitudinal axis of said arbor.

3. The machine of claim 1 further comprising a first separator supply means for feeding a separator to said winding station, said first supply means comprising: (1) a separator source, (2) a separator guide for guiding a separator from said source to said winding station and (3) feeder assembly for advancing a separator from said supply along said guide toward said winding station.

4. The machine of claim 3 further comprising a second separator supply means for feeding separator to said winding station, said second supply means comprising: (1) a second separator source, (2) a second separator guide for guiding separator from said source to said winding station and (3) a second feeder assembly for advancing separator from said supply along said guide toward said winding station.

5. The machine of claim 4 wherein said feeder assembly comprises: (1) a clamp slidably mounted on said guide and having a pair of jaws for receiving a strip of separator, (2) actuator means for opening and closing said jaws and for sliding said clamp along said guide.

6. The machine of claim 5 wherein one of said jaw comprises a eccentrically pivoted contact; wherein said clamp further comprises a slide reciprocally movable relative to said one jaw for engaging and disengaging said contact, said jaws being closed upon engagement of said slide with said contact and being opened upon disengagement of said slide with said contact; and wherein said actuator means further comprises coupling means for reciprocally moving said slide relative to said one jaw and for reciprocally moving said clamp on said slide.

7. The machine of claim 1 wherein said roll canning means further comprising (1) a feeder for supplying cans in a stack, (2) a can pusher for moving a a can from said stack to a loading position, (3) a roll pusher for moving a cell roll from a nest positioned at the canning station into a said can at said loading position and (4) a cell ejection means for ejecting from the loading position the can with a roll inserted therein.

8. The machine of claim 7 wherein said ejection mechanism comprises (1) a loading and ejection clamp having a pair of jaws defining said loading position and (2) actuator means for opening and closing said ejection clamp.

9. The machine of claim 8 wherein said clamp further comprises a jaw support and a slide bar reciprocally movable relative to said jaw support and connected to said actuator means, one of said jaw fixed to said jaw support and the other of said jaws fixed to said slide bar.

10. The machine of claim 9 wherein one of said jaw comprises a eccentrically pivoted contact; wherein said clamp further comprises a slide reciprocally movable relative to said one jaw for engaging and disengaging said contact, said jaws being closed upon engagement of said slide with said contact and being opened upon disengagement of said slide with said contact; and wherein said actuator means further comprises coupling means for reciprocally moving said slide relative to said one jaw and for reciprocally moving said clamp one said slide.

11. The machine of claim 6 wherein said canning means further comprising (1) a feeder for supplying containers in a stack, (2) a container pusher for moving a container from said stack to a loading position, (3) a roll pusher for moving a roll from a nest positioned at the canning station into a said can at said loading position and (4) a cell ejection means for ejecting from the loading position the can with a roll inserted therein.

12. The machine of claim 11 wherein said ejection mechanism comprises (1) a loading and ejection clamp having a pair of jaws defining said loading position and (2) actuator means for opening and closing said ejection clamp.

13. The machine of claim 12 wherein said clamp further comprises a jaw support and a slide bar reciprocally movable relative to said jaw support and connected to said actuator means, one of said jaw fixed to said jaw support and the other of said jaws fixed to said slide bar.

UNITED STATES PATENT AND TRADEMARK OFFICE
CERTIFICATE OF CORRECTION

PATENT NO. : 4,203,206

DATED : May 20, 1980

INVENTOR(S) : Jesse L. Morris et al.

It is certified that error appears in the above-identified patent and that said Letters Patent is hereby corrected as shown below:

The term of this patent subsequent to November 20, 1995, has been disclaimed.

Signed and Sealed this

Fifth Day of February 1985

[SEAL]

Attest:

DONALD J. QUIGG

Attesting Officer

Acting Commissioner of Patents and Trademarks